(No Model.)

E. A. BARBER & A. B. BABBITT.
STREET CAR MECHANISM FOR OPERATING SWITCHES.

No. 527,262. Patented Oct. 9, 1894.

Witnesses.
Albert F. Babbitt
Wm. Bowers

Inventors.
A. B. Babbitt
E. A. Barber
by Benj Arnold. Atty.

UNITED STATES PATENT OFFICE.

EVERETT A. BARBER, OF LAKEWOOD, AND ARTHUR B. BABBITT, OF PAWTUCKET, RHODE ISLAND.

STREET-CAR MECHANISM FOR OPERATING SWITCHES.

SPECIFICATION forming part of Letters Patent No. 527,262, dated October 9, 1894.

Application filed June 27, 1894. Serial No. 515,833. (No model.)

*To all whom it may concern:*

Be it known that we, EVERETT A. BARBER of Lakewood, and ARTHUR B. BABBITT, of Pawtucket, in the county of Providence and State of Rhode Island, have invented certain new and useful Improvements in Street-Car Mechanism for Operating Switches; and we do hereby declare that the following is a full, clear, and exact description thereof, reference being had to the accompanying drawings, and to the letters of reference marked thereon, which form a part of this specification.

This invention relates to that class of devices attached to street railway cars, to enable the driver or conductor to operate the switch from the car when necessary, without stopping it for that purpose. It is fully illustrated in the accompanying drawings.

Figure 1:
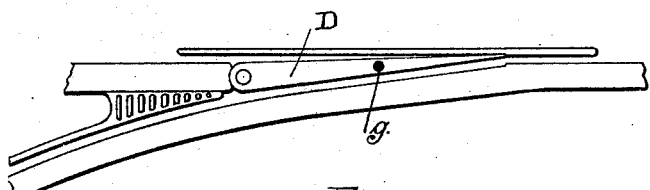
Figure 2:
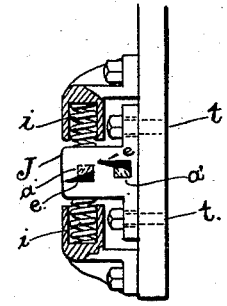
Figure 3:
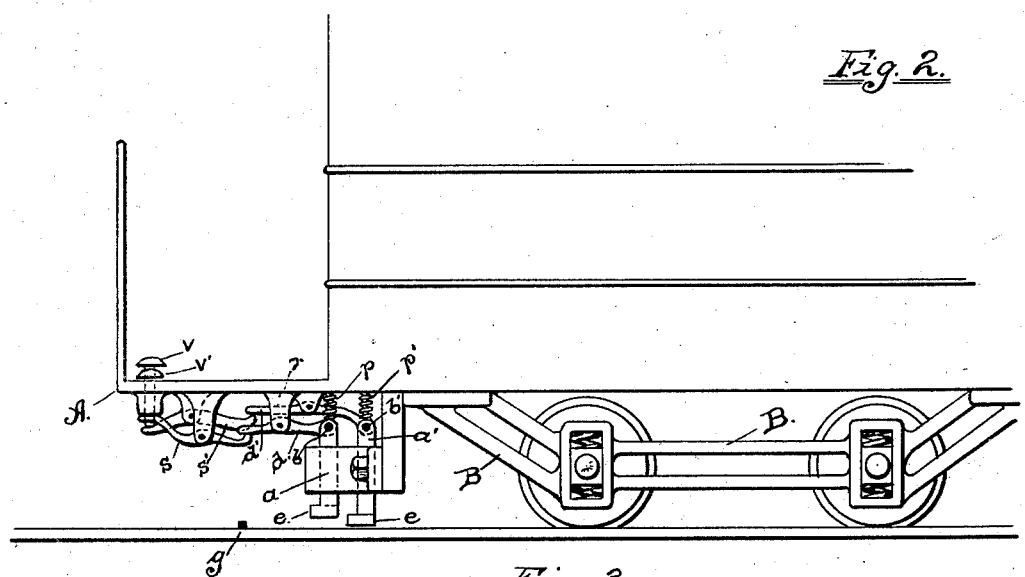
Figure 4:
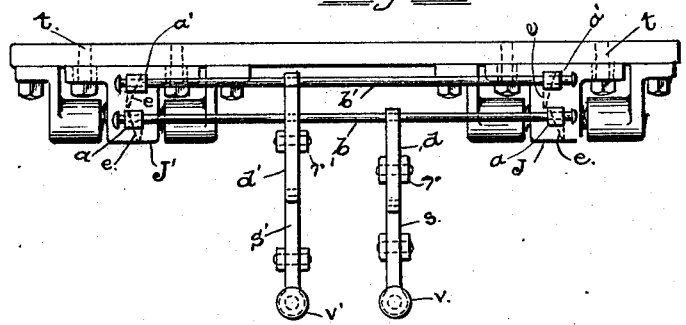

Figure 1, is a plan view of the switch bar and a portion of the rails. Fig. 2, shows the under side of one pair of the switch deflectors. Fig. 3, is a side elevation of the truck, and a part of a car with a side view of the switch operating devices. Fig. 4, is a view from the upper side of the switch operating devices, with the car platform removed.

The construction and arrangement of the parts is as follows:

A, is the car floor and platform.

B, is the truck with the usual wheels and axles.

$b, b'$ are two horizontal bars extending crosswise of the car, over the forward end of the truck.

J, J', are boxes attached to the front of the truck by bolts $t, t$, which pass loosely through slots in the ears of the boxes J, and screw into the truck bar, so that the box is free to move a little sidewise, and springs $i, i$, are placed one on each side of the bar, to bring it back to its proper position after it has been pushed to one side. These boxes J, J', have each two square holes made through them to receive the vertical bars $a, a'$, which are fitted to slide freely in the holes. The bars $a, a'$, have holes through their upper ends to receive the bars $b, b'$, and retractile spiral springs $p, p'$, have each one end attached to these bars $b, b'$, or to the levers that move the bars, and their other ends made fast to the bottom of the car, so as to draw the bars up when they have been pushed down to operate the switch. Two levers, $d, d'$, are pivoted to stands $r, r'$, made fast to the under side of the platform near its middle and in position to receive the bar $b$, in a slot in the inner end of the lever $d$, and the bar $b'$, in a like slot in the inner end of the lever $d'$. The outer ends of the levers $d, d'$, are flattened out to receive the inner ends of two levers $s, s'$, that are supported in like manner from the under side of the car, as the levers $d, d'$, just described. The inner ends of the levers $s, s'$, rest respectively on the outer ends of the levers $d, d'$, and their outer ends are shaped to receive the lower ends of two vertical pins $v, v'$, fitted to slide in holes made through the car platform. The two sets of levers $d$ and $d'$, $s$ and $s'$, are placed far enough apart to bring the pins $v, v'$, opposite to the feet of the driver, so that he can operate one pin with his right foot or the other pin with his left foot, as may be required.

The switch tongue D, (see Fig. 1) has a pin or projection $g$, on its upper side, or some similar device, for the switch shoes $e, e$, to push against and move the switch. As will be seen by reference to Fig. 2, the two deflecting shoes $e, e$, on the lower ends of the vertical bars $a', a'$, are turned to the right to throw the switch tongue D, in one direction, and the two shoes $e', e'$, on the vertical bars $a', a'$, are turned to the left to throw the switch tongue in the opposite direction. By this arrangement, when the driver wishes to switch the car off to the right, he pushes the right pin down with his right foot, and the levers $s'$, will depress the bars $b'$, and cause the shoes $e$, to strike the pin $g$, and throw the tongue D, over to the left, so that the car will go to the right; and when he wants to go to the left, presses the other pin $v$, down with his left foot, which in like manner will operate to press down the bars $a$, and shoes $e$, and the switch tongue will be thrown to the right, and the car will go to the left. If any obstruction; ice for instance, prevents the switch tongue from moving properly when the shoe strikes the projection $g$, the springs $i, i$, at the sides of the boxes J, J', will allow the boxes and bars $a, a'$, to yield to one side, so as to allow the shoe to pass the projection without breaking, though the springs $i$, $i$, are to be made stiff enough to hold the shoes up to move the switch when it is in a normal condition.

The pins $v$, $v'$, are made with round heads on their upper ends; but the lower ends are left of the same size as the body, so that they can be taken out and used at the other end of the car, and cannot be operated when not in use.

Having thus described our improvements, we claim as our invention and desire to secure by Letters Patent—

1. In a car attachment for operating a railway switch two pairs of vertical bars having inclined shoes on their lower ends, held on sliding boxes having springs on each side to keep them in place when not moved by obstructions, in combination with horizontal bars to connect said pairs of vertical bars, springs for raising the horizontal and vertical bars, levers to raise and lower said rods, and means for operating said levers from the car platform, substantially as described.

2. In a car attachment for operating a railway switch the combination of the pins $v$, $v'$, levers $s$, $s'$ and $d$, $d'$, with the rods $b$, $b'$ and the deflector bars $a$, $a'$, connected by said bars $b$, $b'$, with springs $p$ $p'$ for raising said bars $b$ $b'$ and deflector bars $a$ $a'$, substantially as described.

EVERETT A. BARBER.
ARTHUR B. BABBITT.

Witnesses:
BENJ. ARNOLD,
JAMES E. ARNOLD.